US011360663B2

(12) United States Patent
Haggerty et al.

(10) Patent No.: US 11,360,663 B2
(45) Date of Patent: Jun. 14, 2022

(54) PRESENTING MINIPROFILE FROM FEED

(71) Applicant: Twitter, Inc., San Francisco, CA (US)

(72) Inventors: Bryan Haggerty, San Francisco, CA (US); Brittany Forks, San Francisco, CA (US); Zayaan Khatib, San Francisco, CA (US); Vincent Lee, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 0 days.

(21) Appl. No.: 16/533,520

(22) Filed: Aug. 6, 2019

(65) Prior Publication Data

US 2021/0042025 A1 Feb. 11, 2021

(51) Int. Cl.
*G06F 3/04812* (2022.01)
*G06F 3/04817* (2022.01)
*G06F 3/04883* (2022.01)
*G06F 3/0485* (2022.01)

(52) U.S. Cl.
CPC ........ *G06F 3/04883* (2013.01); *G06F 3/0485* (2013.01); *G06F 3/04812* (2013.01); *G06F 3/04817* (2013.01)

(58) Field of Classification Search
CPC ............. G06F 3/04883; G06F 3/04812; G06F 3/04817; G06F 3/0485
See application file for complete search history.

(56) References Cited

U.S. PATENT DOCUMENTS

| 10,229,218 | B1* | 3/2019 | Cohen | G06F 16/9558 |
| 2008/0077595 | A1* | 3/2008 | Leebow | G06Q 10/10 |
| 2015/0058957 | A1* | 2/2015 | Halliday | H04L 51/32 726/7 |
| 2016/0011758 | A1* | 1/2016 | Dornbush | H04L 65/601 348/14.03 |
| 2016/0179798 | A1* | 6/2016 | Franks | G06F 3/04883 715/739 |
| 2017/0357386 | A1* | 12/2017 | Felt | G06T 13/80 |

* cited by examiner

*Primary Examiner* — Jennifer N Welch
*Assistant Examiner* — Amy P Hoang
(74) *Attorney, Agent, or Firm* — Brake Hughes Bellermann LLP

(57) ABSTRACT

A computing system can present a miniprofile comprising an avatar associated with a first account, a handle associated with the first account, a description associated with the first account, and a swipe icon; receive, at the swipe icon, an upward swipe; in response to receiving the upward swipe, present a occupying a larger portion of the display than the miniprofile, the full profile comprising an image associated with the first account, the avatar, the handle, the description, and at least a first post associated with the first account; receive, at the swipe icon, a downward swipe; determine that the downward swipe was a fast downward swipe; and based on determining that the downward swipe was the fast downward swipe, close the full profile and present a feed, the feed comprising at least a second post associated with a second account and a third post associated with a third account.

20 Claims, 18 Drawing Sheets

PRESENTING MINIPROFILE FROM FEED

CROSS-REFERENCE TO RELATED APPLICATION

This application is related to U.S. patent application Ser. No. 29/700,848, filed Aug. 6, 2019, entitled "DISPLAY SCREEN USER INTERFACE FOR PEEKING AT A PROFILE", the disclosure of which is incorporated by reference herein in its entirety.

TECHNICAL FIELD

This description relates to graphical user interfaces.

BACKGROUND

Social media can include posts from various accounts. Users may want to learn about an account associated with a post.

SUMMARY

A non-transitory computer-readable storage medium can comprise instructions stored thereon. When executed by at least one processor, the instructions can be configured to cause a computing system to at least present, within a graphical user interface (GUI) on a display, a miniprofile, the miniprofile comprising an avatar associated with a first account, a handle associated with the first account, a description associated with the first account, and a swipe icon, receive, at the swipe icon within the miniprofile, an upward swipe, in response to receiving the upward swipe, present, within the GUI, a full profile, the full profile occupying a larger portion of the display than the miniprofile, the full profile comprising an image associated with the first account, the avatar, the handle, the description, and at least a first post associated with the first account, receive, at the swipe icon within the full profile, a downward swipe, determine that the downward swipe was a fast downward swipe, and based on determining that the downward swipe was the fast downward swipe, close the full profile and present, within the GUI, a feed, the feed comprising at least a second post associated with a second account and a third post associated with a third account.

A non-transitory computer-readable storage medium can comprise instructions stored thereon. When executed by at least one processor, the instructions can be configured to cause a computing system to at least present, within a graphical user interface (GUI) on a display, a feed, the feed comprising a least a first post and a second post, the first post including a first symbol associated with a first account and first content associated with the first account, the second post including a second symbol associated with a second account and second content associated with the second account, receive, at the first symbol, a gesture, and in response to receiving the gesture, present, within the GUI, a miniprofile, a top portion of the miniprofile being located in a middle third of the display, the miniprofile at least partially covering at least one of the first post or the second post, the miniprofile comprising at least the first symbol, a description associated with the first account, and a swipe icon.

A non-transitory computer-readable storage medium can comprise instructions stored thereon. When executed by at least one processor, the instructions can be configured to cause a computing system to at least present, within a graphical user interface (GUI) on a display, a feed, the feed comprising a least a first post and a second post, the first post including a first symbol associated with a first account and first content associated with the first account, the second post including a second symbol associated with a second account and second content associated with the second account, receive, at the first symbol, a gesture, in response to receiving the gesture, present, within the GUI, a miniprofile, a top portion of the miniprofile being located in a middle third of the display, the miniprofile at least partially covering at least one of the first post or the second post, the miniprofile comprising at least the first symbol, a description associated with the first account, and a swipe icon, receive, at the swipe icon within the miniprofile, an upward swipe, in response to receiving the upward swipe, present, within the GUI, a full profile, the full profile occupying a larger portion of the display than the miniprofile, the full profile comprising an image associated with the first account, the first symbol, the description associated with the first account, at least a first post associated with the first account, and the swipe icon, receive, at the swipe icon within the full profile, a downward swipe, determine that the downward swipe was a fast downward swipe, and based on determining that the downward swipe was the fast downward swipe, close the full profile and present, within the GUI, the feed.

The details of one or more implementations are set forth in the accompanying drawings and the description below. Other features will be apparent from the description and drawings, and from the claims.

BRIEF DESCRIPTION OF THE DRAWINGS

Like reference numbers refer to like elements.

DETAILED DESCRIPTION

Within a feed of posts, such as within a social media application or social media webpage, a user can input a gesture to a symbol, such as a handle or avatar, associated with one of the posts. A miniprofile can be presented in response to the gesture. The miniprofile can present less information than a full profile. Within the miniprofile, the user can swipe up on a gesture icon to view the full profile, or swipe down in the gesture icon to return to the feed. Within the full profile, the user can input a slow swipe down gesture on the gesture icon to return to the miniprofile, or can input a fast swipe down gesture on the gesture icon to return to the feed.

Figure 1A:
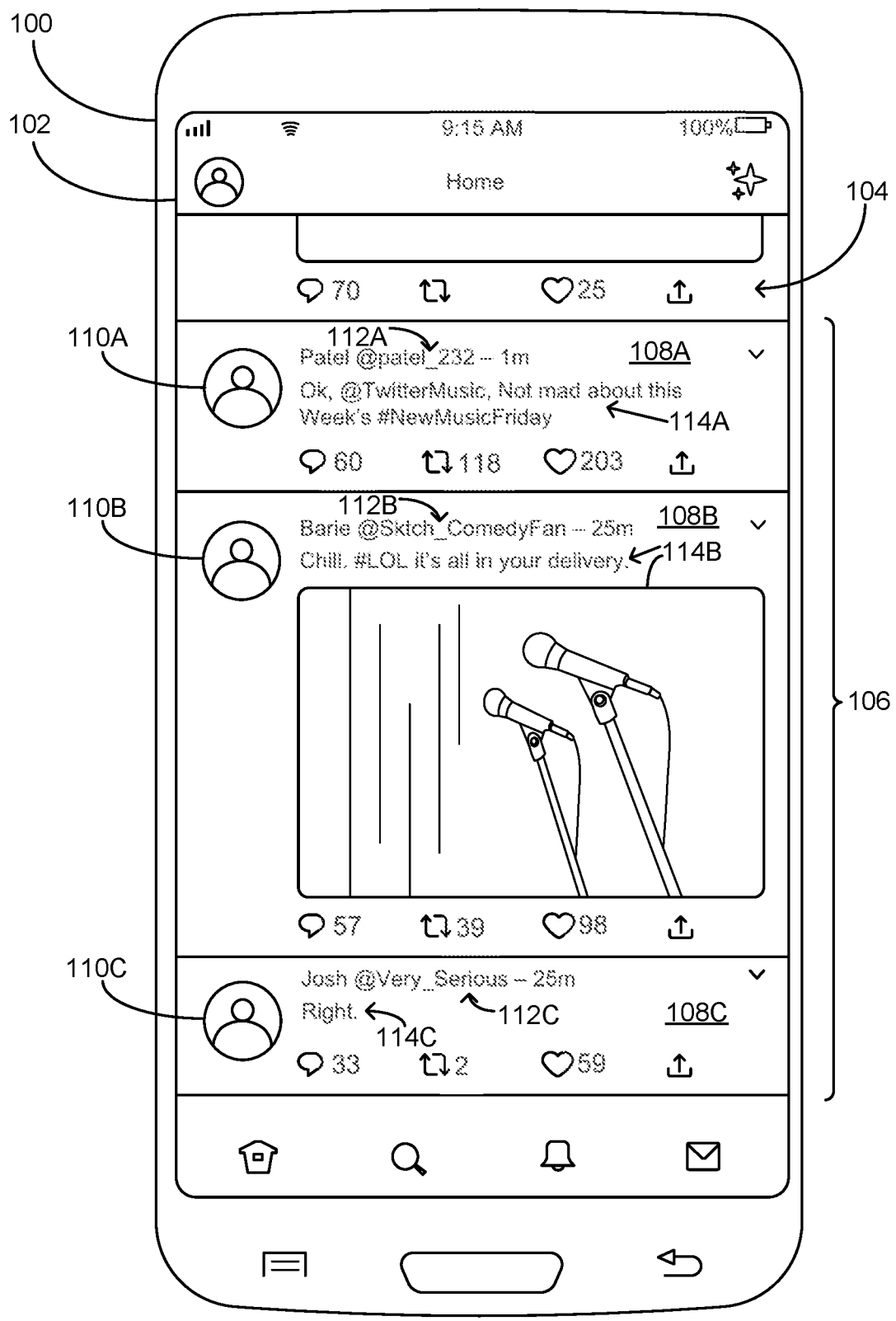
FIG. 1A shows a computing device with a graphical user interface (GUI) presenting a feed.

FIG. 1A shows a computing device 100 with a graphical user interface (GUI) 104 presenting a feed 106. The computing device 100 can be a device capable of executing instructions, receiving input, and providing output, such as a smartphone, a tablet computing device, a thin client, a laptop or notebook computer, or a desktop computer, as non-limiting examples. The computing device 100 can include a display 102. The display 102 can present and/or output graphical and/or visual output, such as text and/or images. In some examples, the display 102 can receive input, such as touch input and/or gestures, including taps and/or swipes.

The computing device 100 can generate a graphical user interface (GUI) 104 within the display 102. The GUI 104 can present graphical and/or textual information, such as a feed, a miniprofile, and/or a full profile, as described below. The GUI 104 can receive input, such as taps and/or swipes.

In the example shown in FIG. 1A, the GUI 104 can present a feed 106. The feed 106 can include multiple posts, such as a first post 108A, a second post 108B, and/or a third post 108C. The posts 108A, 108B, 108C can include information uploaded by, and/or associated with, other accounts. The posts 108A, 108B, 108C can include information likely to be interesting to a user of the computing device 100, and/or posts associated with and/or uploaded by accounts that the user is following.

In some examples, each of the posts 108A, 108B, 108C can include a symbol. The symbol can include an avatar 110A, 110B, 110C and/or a handle 112A, 112B, 112C. The avatar 110A, 110B, 110C can include an image inside a circle and/or ellipse. The image can be associated with, and/or have previously been uploaded by, the account associated with the respective post 108A, 108B, 108C. The handle 112A, 112B, 112C can include a text string uniquely associated with the account associated with the respective post 108A, 108B, 108C.

In some examples, each of the posts 108A, 108B, 108C can include content 114A, 114B, 114C. The content 114A, 114B, 114C can include text and/or images (such as photographs) uploaded by a user of the account associated with the respective post.

A user of the computing device 100 may desire to learn more about an account associated with a post 108A, 108B, 108C. The user can request information about one of the accounts by providing input to one of the symbols, such as a tap or swipe onto the avatar 110A, 110B, 110C and/or handle 112A, 112B, 112C.

Figure 1B:
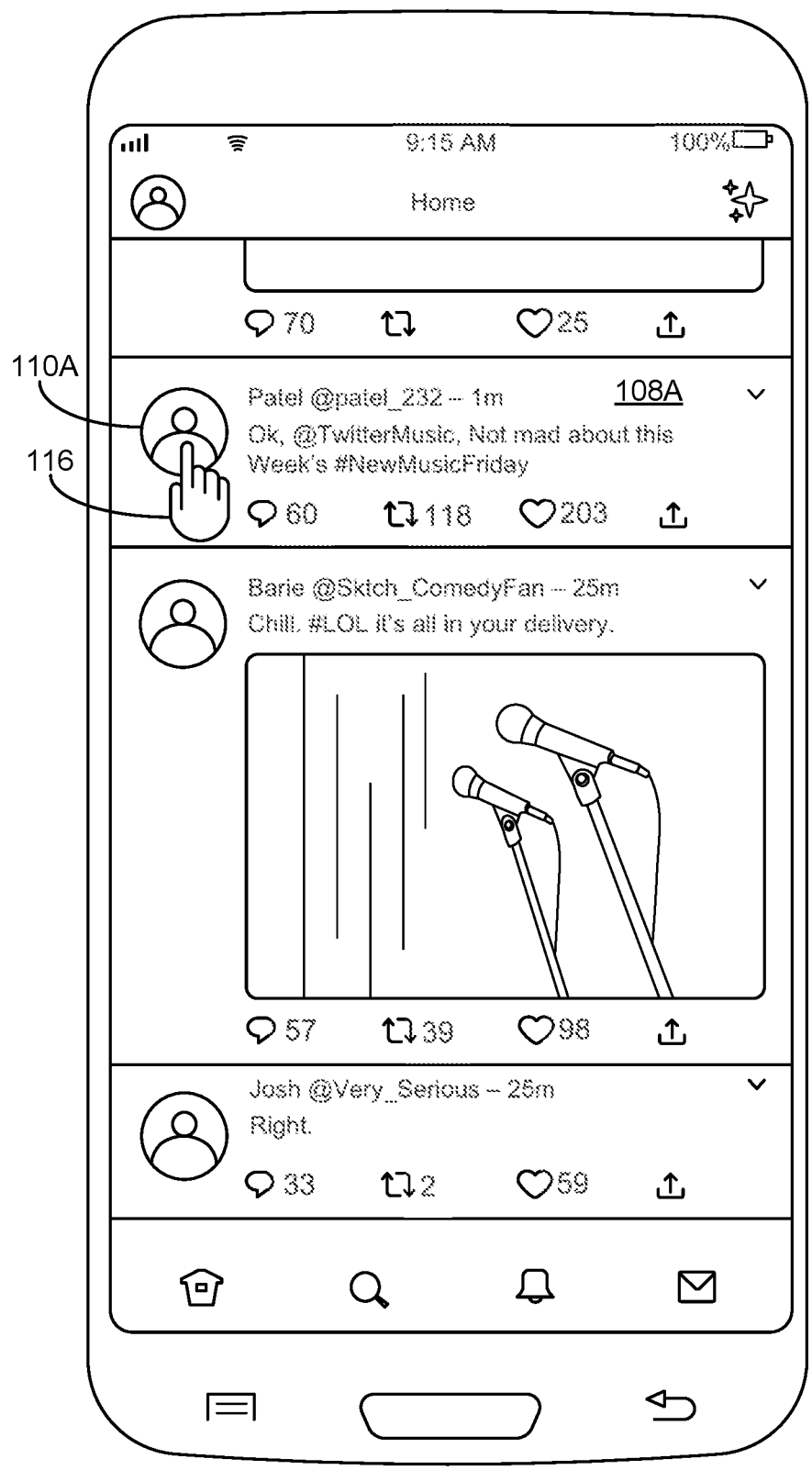
FIG. 1B shows a user inputting a gesture to an avatar within the feed.

FIG. 1B shows a user inputting a gesture 116 to the avatar 110A within the feed 106. The gesture 116 can represent a cursor hovering over the symbol, or a symbolic representation of the user tapping or swiping on the avatar 110A with a body part such as a finger or with a stylus or cursor. The user can input the gesture 116 to the avatar 110A because, for example, the user is interested in learning more about the account associated with the post 108A within which the avatar 110A is included.

Figure 1C:
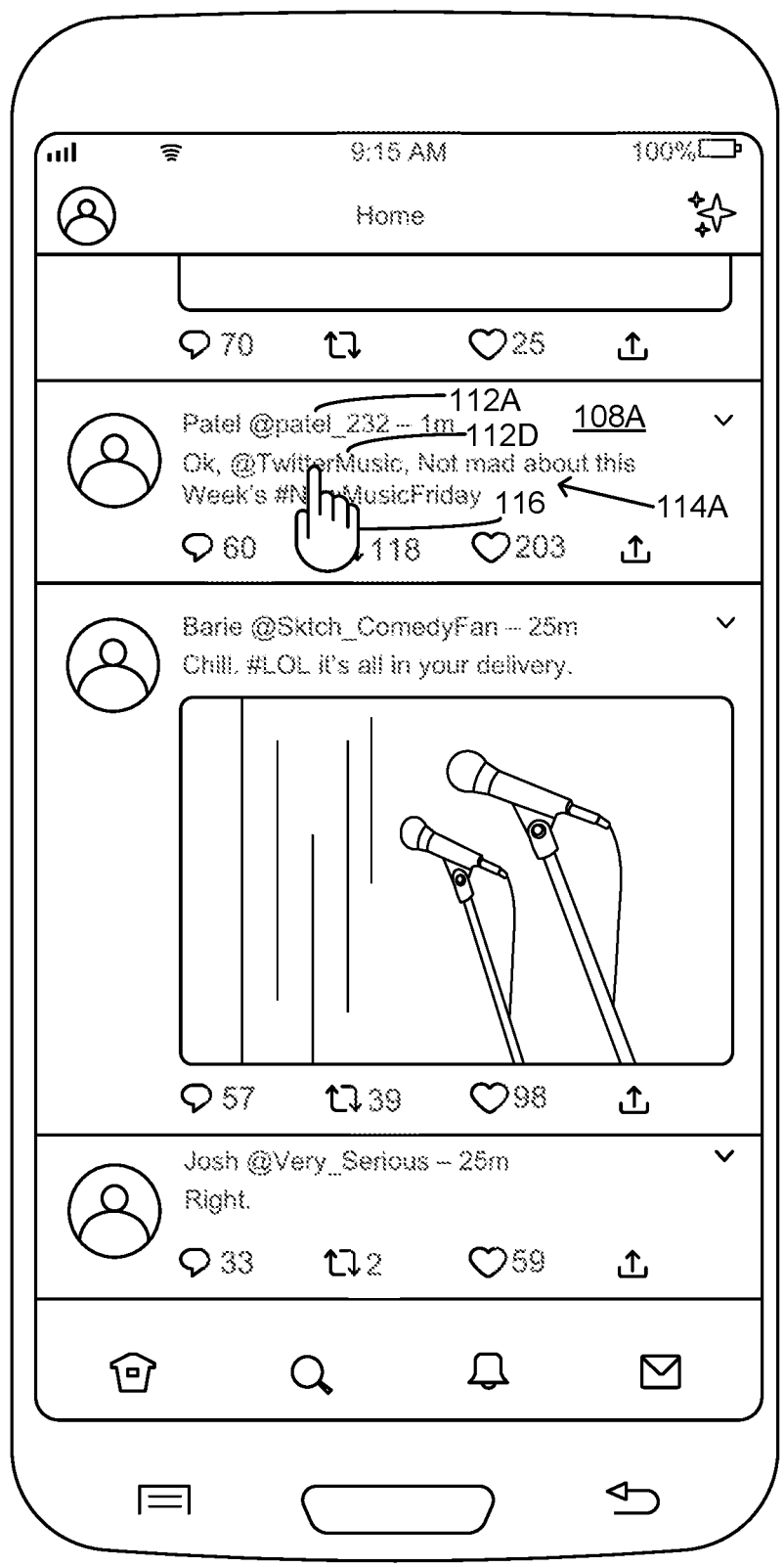
FIG. 1C shows a user inputting a gesture to a handle within the feed.

FIG. 1C shows a user inputting the gesture 116 to the handle 112A within the feed 106. The gesture 116 can be a tap or a click, and/or can represent a cursor, or a symbolic representation of the user or cursor tapping or swiping on the handle 112D. In this example, the user has inputted the gesture 116 to a handle 112D included in the post 108A. The handle 112D can be similar to the handle 112A, but can be associated with a different account than the account that uploaded the post 108A. The handle 112D can be included in the content 114A of the post 108A.

Figure 2A:
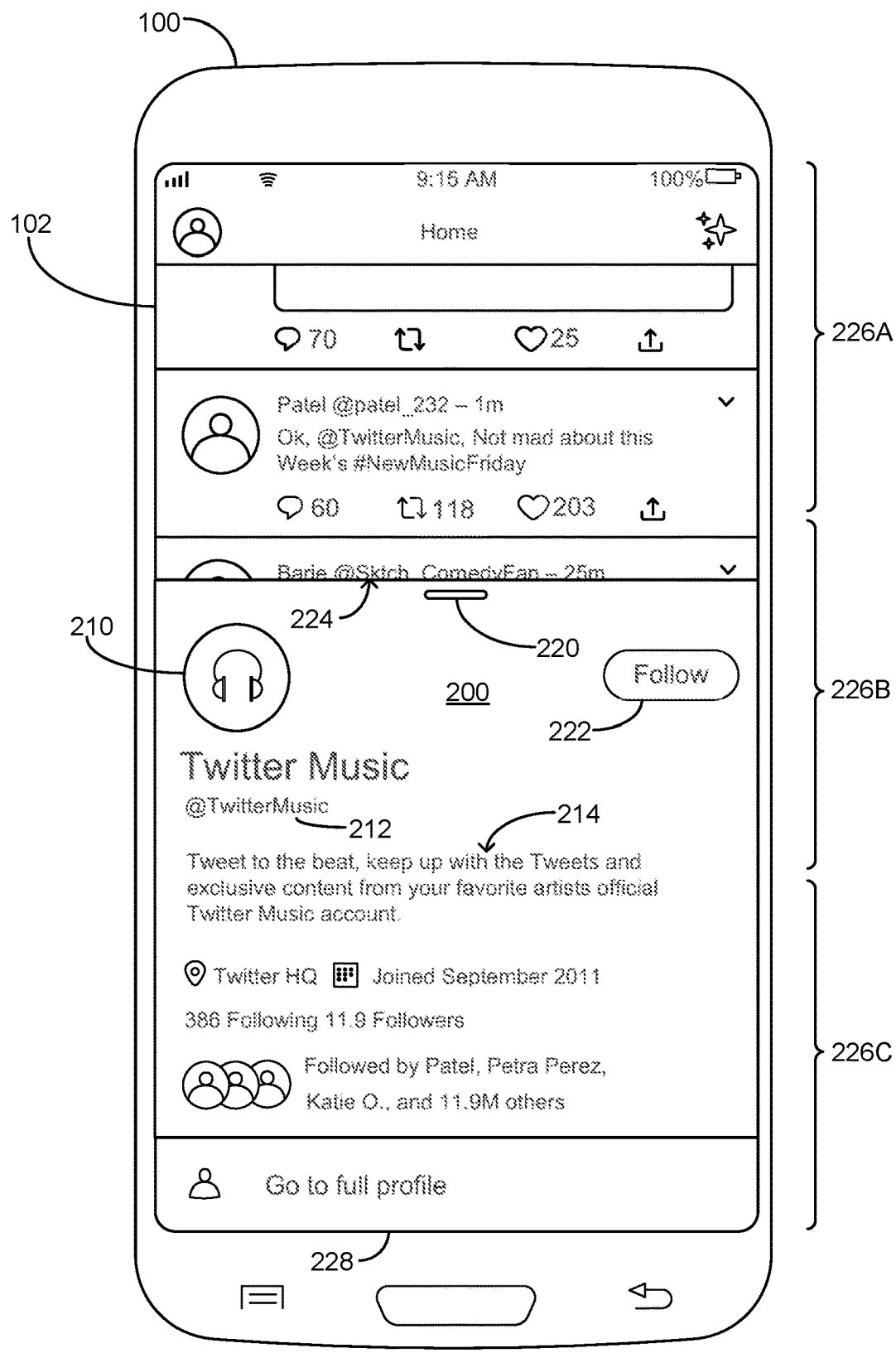
FIG. 2A shows a miniprofile with the feed.

FIG. 2A shows a miniprofile 200 with the feed 106 (not labeled in FIG. 2A). The computing device 100 can present the miniprofile 200 within the GUI 104 in response to the user inputting either of the gestures 116 shown in FIGS. 1B and 1C. In this example, the miniprofile 200 is associated with the account that is associated with the handle 112D to which the gesture 116 shown in FIG. 1C was directed.

Figure 3A:
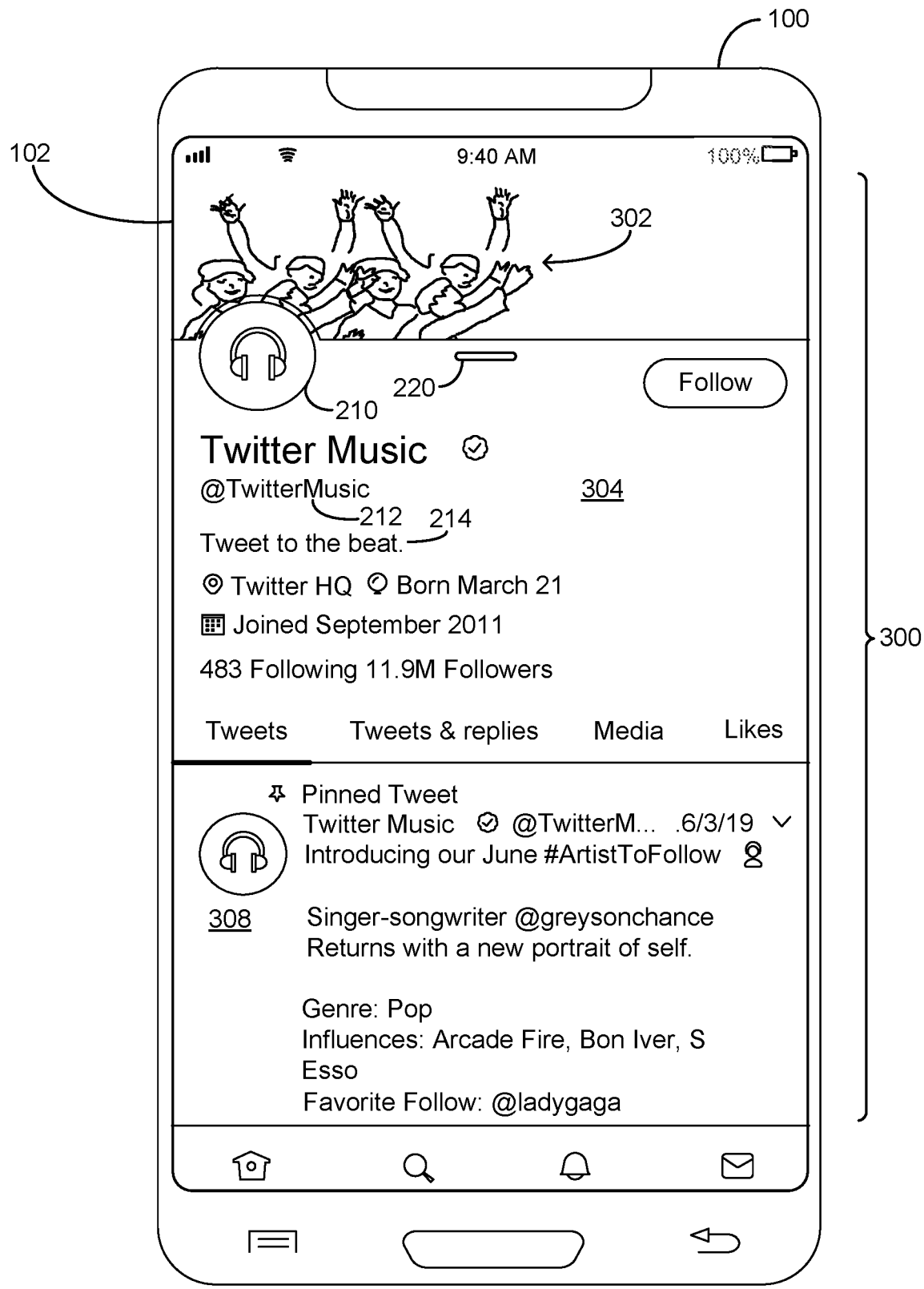
FIG. 3A shows a full profile within the GUI.
Figure 3B:
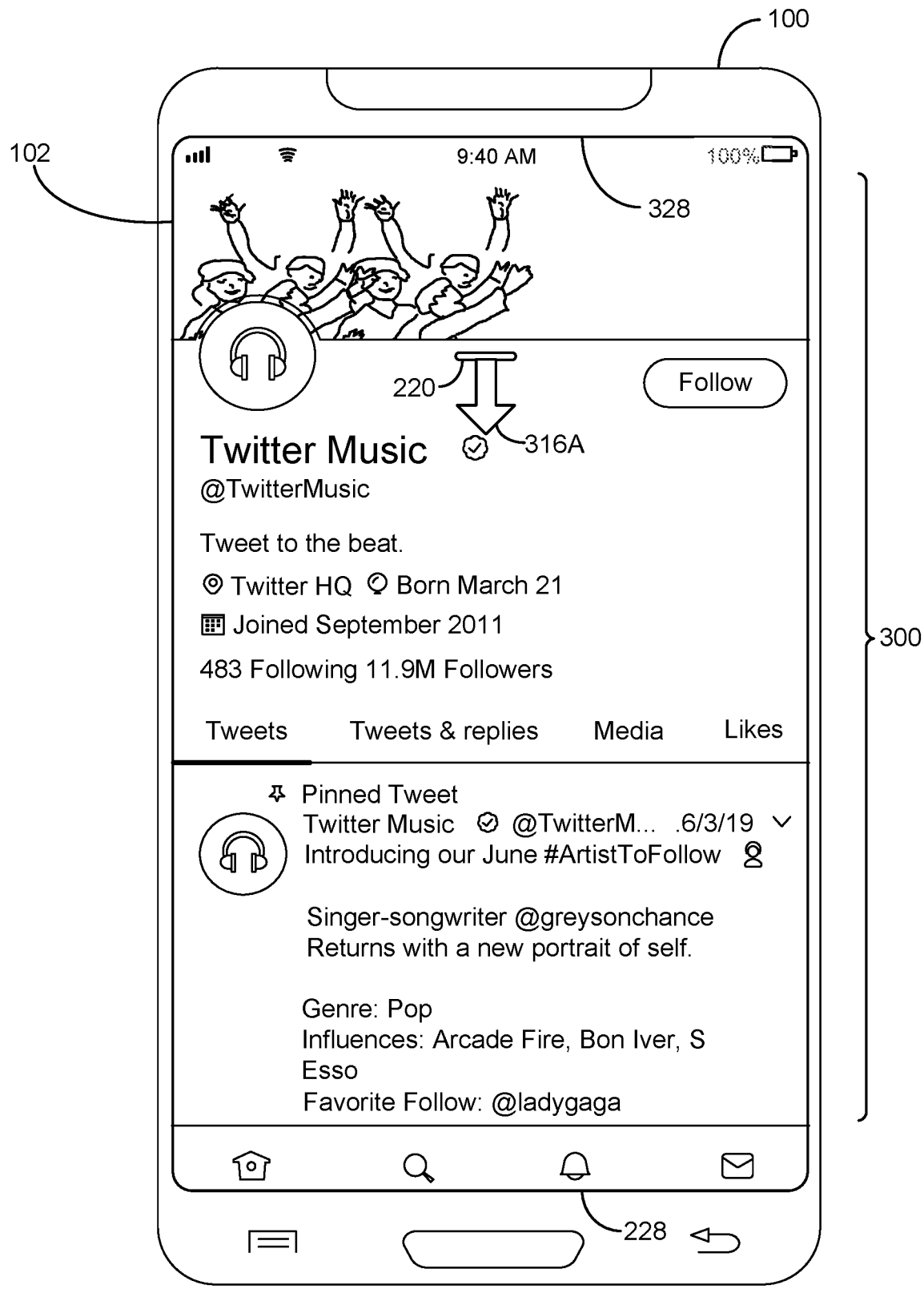
FIG. 3B shows a user inputting a slow swipe down gesture to a swipe icon within the full profile.
Figure 3C:
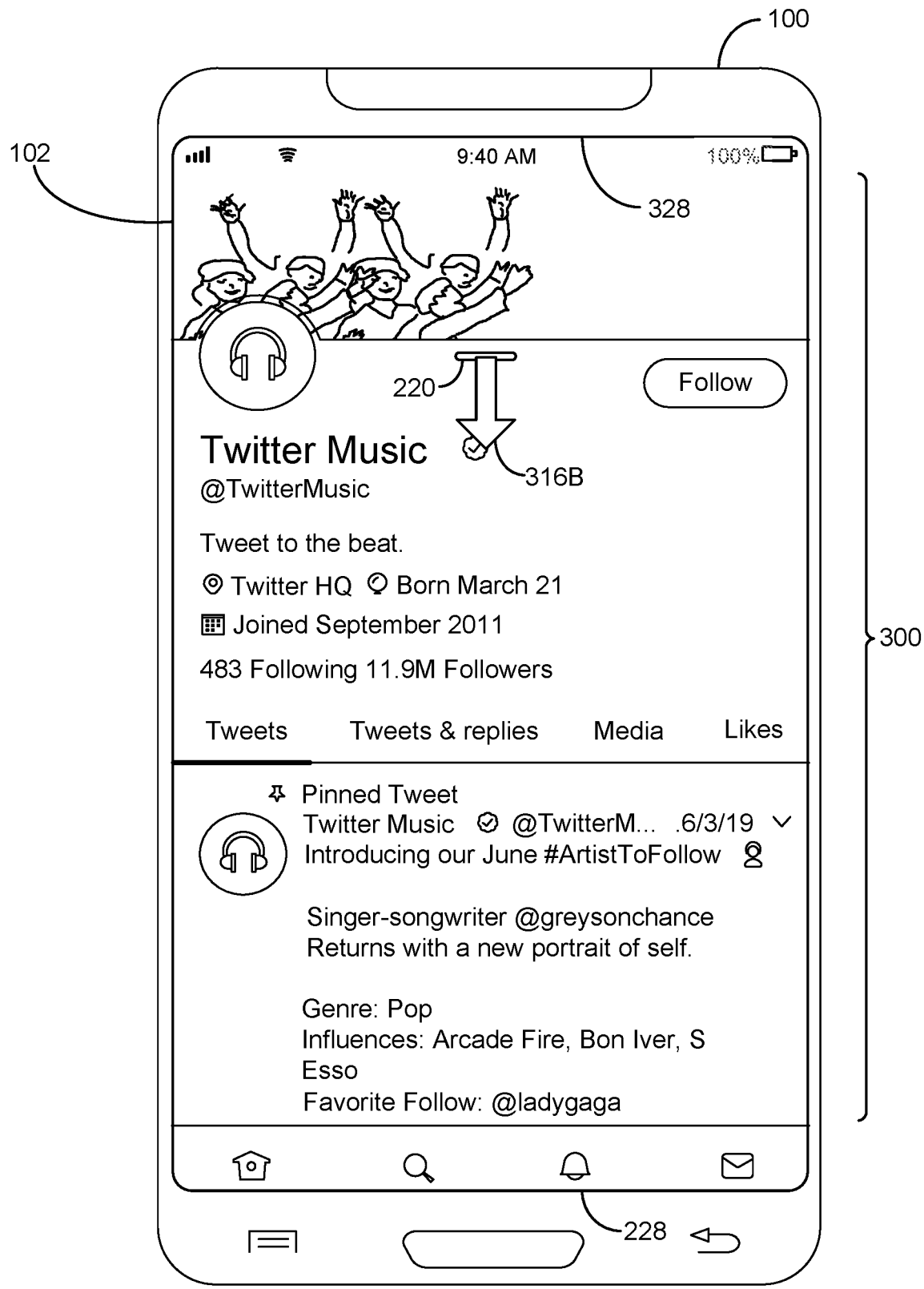
FIG. 3C shows a user inputting a fast swipe down gesture to the swipe icon within the full profile.

The miniprofile 200 can include more information about an account than the posts 108A, 108B, 108C (not labeled in FIG. 2A), but less information than a full profile 300 (shown in FIGS. 3A, 3B, and 3C). The miniprofile 200 can include, for example, an avatar 210 associated with the account for which the miniprofile 200 is presented, a handle 212 associated with the account for which the miniprofile 200 is presented, a description 214 associated with the account for which the miniprofile 200 is presented, and/or a swipe icon 220. The avatar 210 can include an image, such as a photograph or logo, inside a shape such as a circle or ellipse. The handle 212 can be the same as the handle 112D shown in FIG. 1C onto which the user inputted the gesture 116. The description 214 can be a description of the account uploaded by a user or administrator of the account. The swipe icon 220 can receive single-finger gestures, such as swipe gestures, to return to the feed 106 (labeled in FIGS. 1A, 1B, and 1C) and/or present a full profile 300. In some examples, fewer computing resources are utilized generating the miniprofile 200 than a full profile.

In some examples, a top portion 224 of the miniprofile 200 can be located in a middle third 226 of the display 102. The display 102 can be divided vertically into a top third 226A, a middle third 226B, and a bottom third 226C. The top portion 224 of the miniprofile 200 can be located in a middle third 226 of the display 102, and a bottom portion of the miniprofile 200 at a bottom portion 228 and/or bottom third 226C of the display 202, so that the miniprofile 200 occupies about half of the area of the display 102.

In some examples, the miniprofile 200 can scroll up from the bottom portion 228 of the display 102. The miniprofile 200 can scroll up from the bottom portion 228 of the display 102 in response to the gesture 116 on the avatar 110A or handle 112A (shown in FIGS. 1B and 1C). The miniprofile 200 can scroll up and cover some of the posts 108A, 108B, 108C (shown in full in FIGS. 1A, 1B, and 1C). While and/or after the miniprofile 200 scrolls up, and/or when and/or after the miniprofile 200 is displayed, the posts 108A, 108B, 108C can remain in same positions on the display 102 as before the miniprofile 200 scrolled up and/or was displayed, with some of the posts 108A, 108B, 108C fully or partially covered by the miniprofile 200.

In some examples, the miniprofile 200 can include and/or present a follow button 222. The follow button 222 can enable a user to request to follow the account associated with the miniprofile 200, and/or request a server to present and/or send posts 108A, 108B, 108C, which are associated with the account associated with the miniprofile 200, to the user's computing device 100.

Figure 2B:
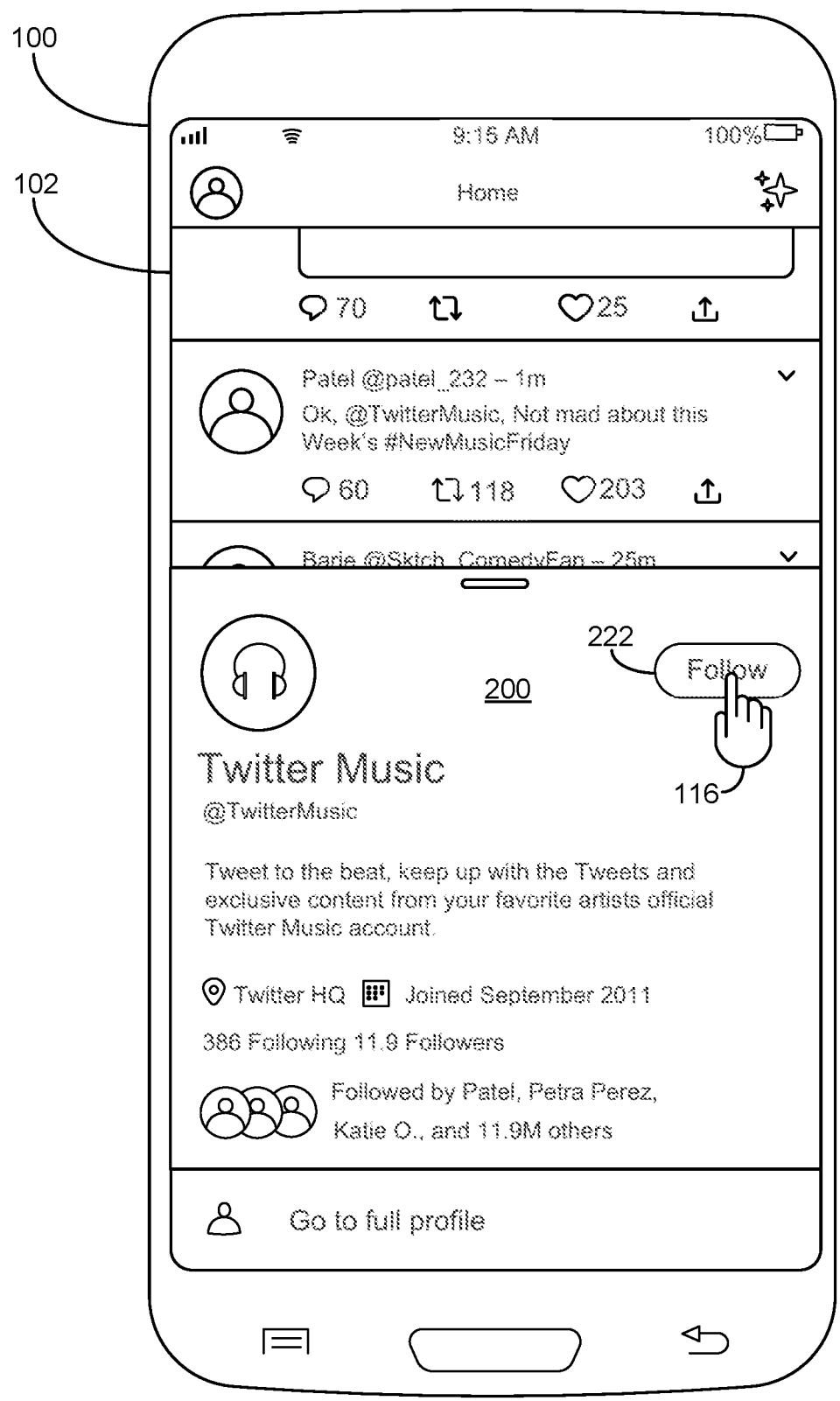
FIG. 2B shows a user inputting a gesture to a follow button within the miniprofile.

FIG. 2B shows a user inputting a gesture 116 to the follow button 222 within the miniprofile 200. The gesture 116 can include a tap and/or swipe onto a touchscreen display 102, or, if the user has a mouse or other peripheral input device, the user moving and/or hovering a cursor over the follow button 222 and clicking on the follow button 222. The computing device 100 can respond to the gesture 116 being inputted to the follow button 222 by sending a follow request to a server, the follow request identifying the account associated with the miniprofile 200.

Figure 2C:
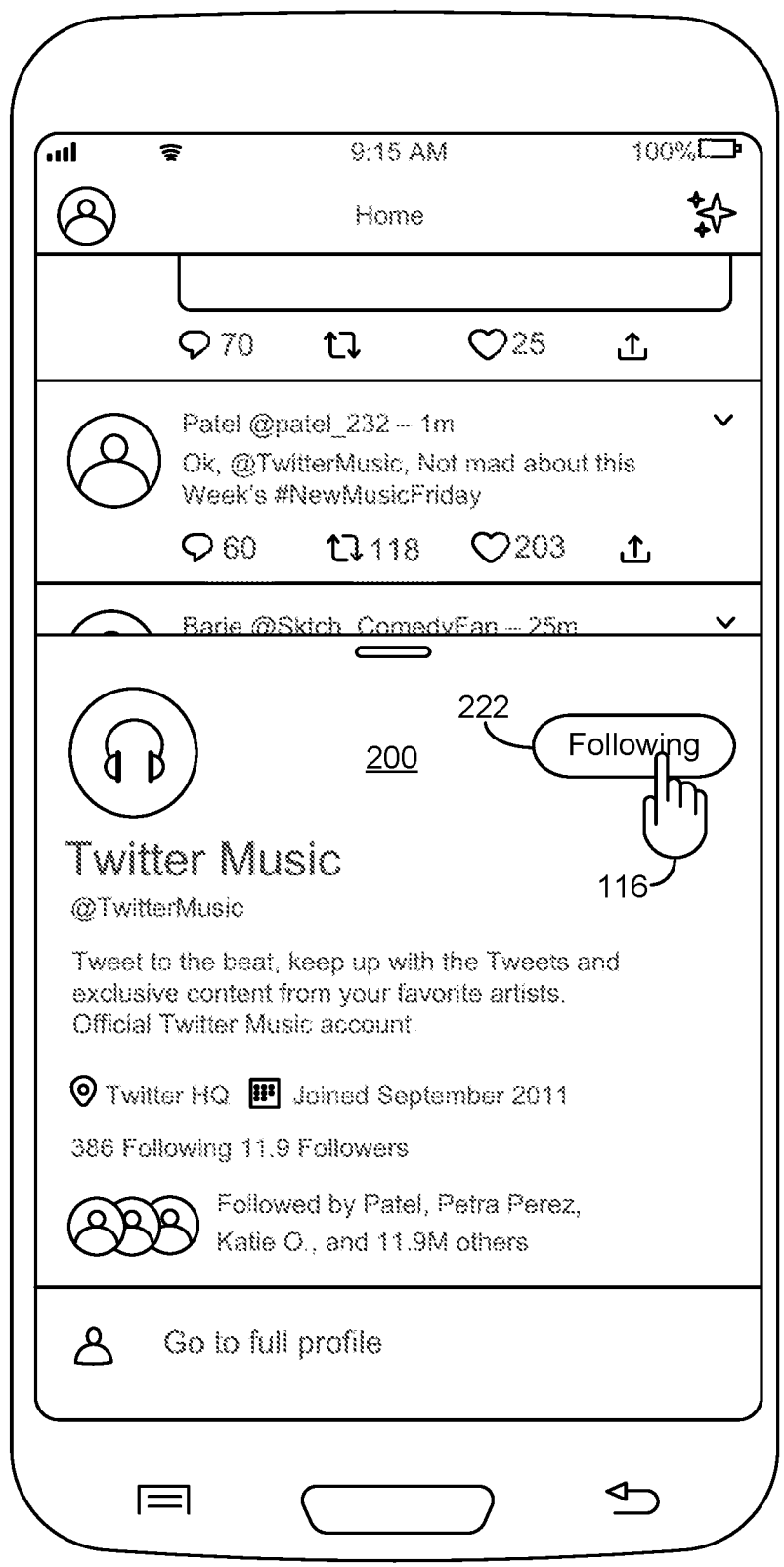
FIG. 2C shows a response to the user inputting the gesture to the follow button within the miniprofile.

FIG. 2C shows a response to the user inputting the gesture 116 to the follow button 222 within the miniprofile 200. In this example, the computing device 100 has responded to the gesture 116 on the follow button 222 by changing the text inside the follow button 222 from "Follow" (shown in FIG. 2B) to "Following."

Figure 2D:
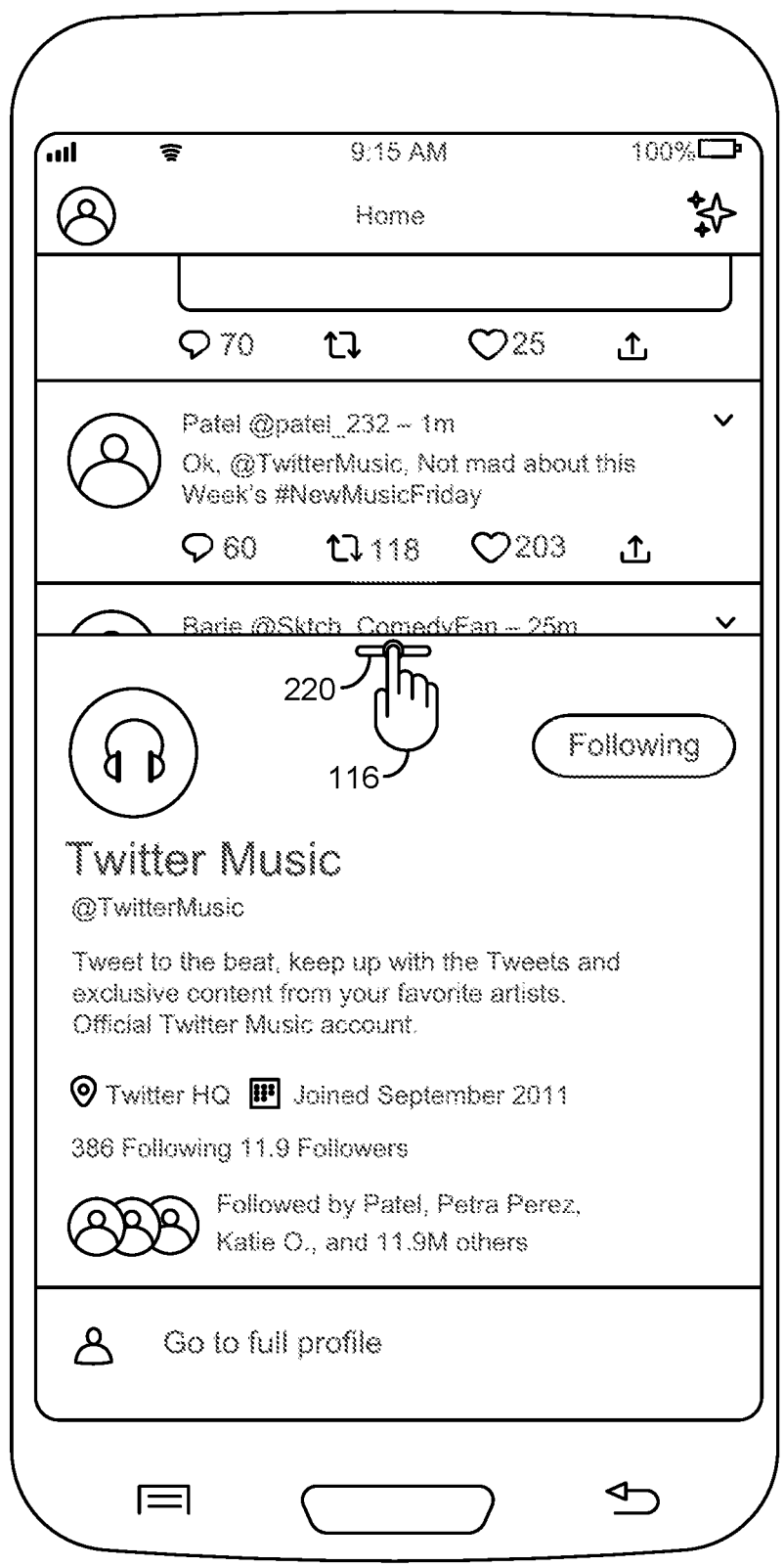
FIG. 2D shows the user providing input to the swipe icon within the miniprofile.

FIG. 2D shows the user providing input 116 to the swipe icon 220 within the miniprofile 200. The user can place a cursor or input device (such as a finger or stylus) over the swipe icon 220 to begin a swipe gesture.

Figure 2E:
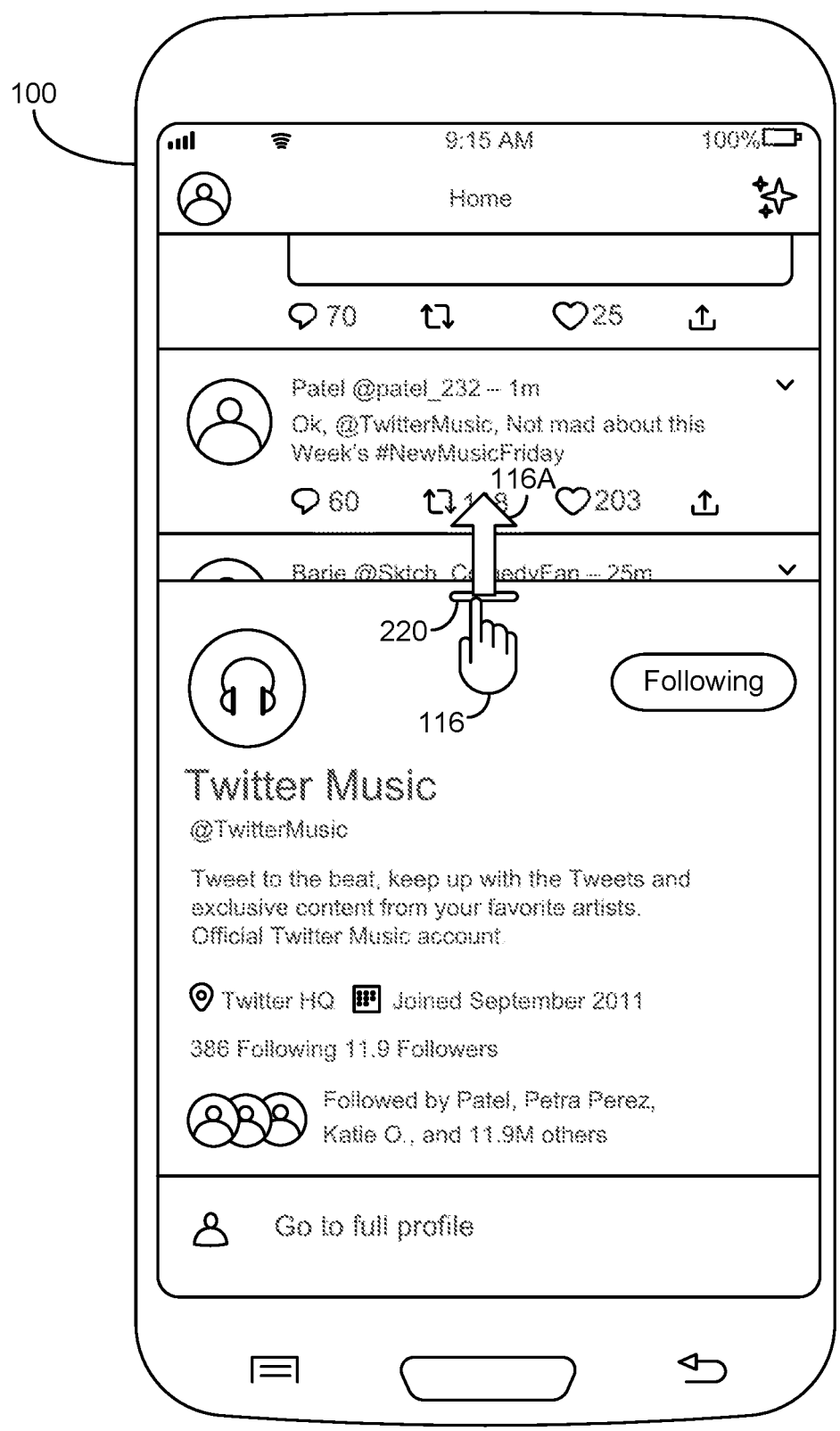
FIG. 2E shows a user inputting a swipe up gesture to a swipe icon within the miniprofile.

FIG. 2E shows a user inputting a swipe up gesture 116A to the swipe icon 220 within the miniprofile 200. The user can swipe up 116A on the swipe icon 220 to request to see a full profile 300 (shown in FIG. 3A) for the account that is associated with the miniprofile. The computing device 100 can respond to the upward swipe 116A by presenting the full profile 300, shown in FIG. 3A.

Figure 2F:
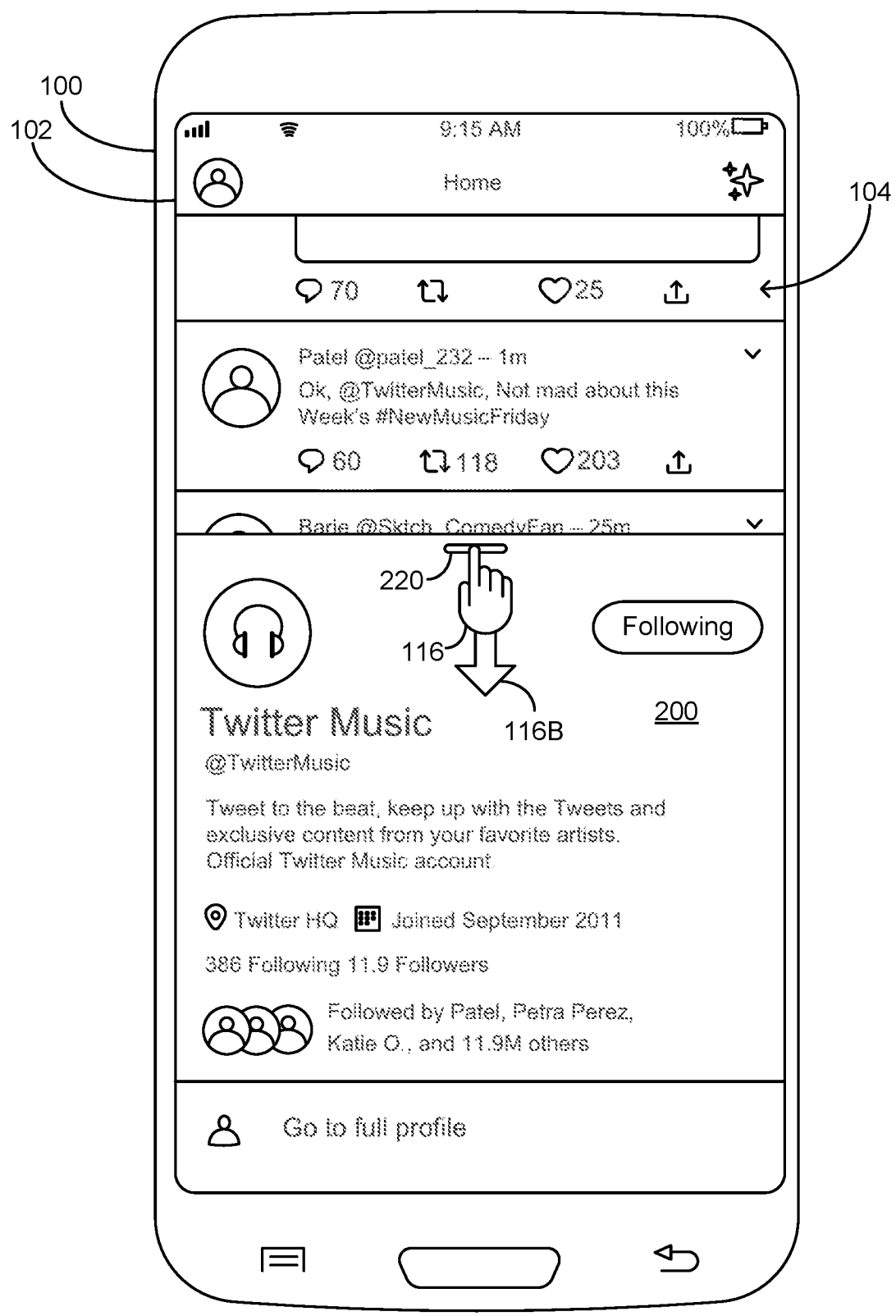
FIG. 2F shows a user inputting a swipe down gesture to the swipe icon within the miniprofile.

FIG. 2F shows a user inputting a swipe down gesture 116B to the swipe icon 220 within the miniprofile 200. The user can swipe down 116B on the swipe icon 220 to dismiss the miniprofile 200. The computing device 100 can respond to the swipe down 116B input by removing the miniprofile 200 from the GUI 104 and/or display 102, such as by scrolling the miniprofile 200 down until the miniprofile 200 disappears, and/or presenting the feed 106 instead of the miniprofile 200.

FIG. 3A shows a full profile 300 within the GUI 104. The computing device 100 can present the full profile 300 in the display 102 in response to the user swiping up on the swipe icon 220 within the miniprofile 200, as described above with respect to FIG. 2E, or in response to a user request to view the full profile 300 from within the feed 106 (shown in FIGS. 1A, 1B, and 1C).

The full profile 300 can include some or all of the elements of the miniprofile 200. The full profile 300 can include the avatar 210 associated with the account for which the full profile 300 is presented, the handle 212 associated with the account, the description 214 (and/or an alternative version of the description 214) associated with the account, and/or the swipe icon 220.

The full profile 300 can include additional elements that were not included in the miniprofile 200. The full profile 300 can include an image 302. The image 302, and/or a top portion of the full profile 300, can be included in a top portion, and/or a top third, of the full profile 300. The image 302 can be associated with the account that is associated with the full profile 300. The image 302 can be a picture image, such as a Joint Photographic Experts Group (JPEG) file, Graphics Interchange Format (GIF) file, or a Portable Network Graphics (PNG) file, as non-limiting examples. The image 302 may have previously been uploaded by the account associated with the full profile 300.

The full profile 300 can include at least a first post 308 associated with the account, and/or posted by the account, that is associated with the full profile 300. The post 308 can include any combination of elements of the posts 108A, 108B, 108C shown and described above with respect to FIGS. 1A, 1B, and 1C. The post 308 can identify the account associated with the full profile 300. The post 308 can include content uploaded by the account associated with the full profile 300.

In some examples, the computing device 100 can transition from presenting the full profile 300 to presenting either the miniprofile 200 shown in FIGS. 2A, 2B, 2C, 2D, 2E, and 2F, or the feed 106 shown in FIGS. 1A, 1B, and 1C, based on user input. In some examples, the computing device 100 can transition from presenting the full profile 300 to presenting either the miniprofile 200 or the feed 106 based on a downward swipe on the swipe icon 220.

In some examples, the computing device 100 can transition from presenting the full profile 300 to presenting the miniprofile 200 in response to receiving a slow downward swipe on the swipe icon 220. In some examples, the computing device 100 can transition from presenting the full profile 300 to presenting the feed 106 in response to receiving a fast swipe on the swipe icon 220. In some examples, the computing device 100 can respond to receiving a downward swipe on the swipe icon 220 by determining whether the downward swipe was a fast downward swipe or a slow downward swipe. The computing device 100 can determine whether the downward swipe was a fast downward swipe or a slow downward swipe by comparing a speed of the downward swipe to a swipe speed threshold. If the speed of the downward swipe meets or exceeds the swipe speed threshold, then the computing device 100 can determine that the downward swipe was a fast downward swipe and transition from presenting the full profile 300 to presenting the feed 106. If the speed of the downward swipe does not meet or exceed the swipe speed threshold, and/or is less than the swipe speed threshold, then the computing device 100 can determine that the downward swipe was a slow downward swipe and transition from presenting the full profile 300 to presenting the miniprofile 200.

FIG. 3B shows a user inputting a slow swipe down gesture 316A to a swipe icon 220 within the full profile 300. The computing device 100 can determine that the swipe down gesture 316A is a slow swipe down gesture by comparing the speed of the downward swipe to the swipe speed threshold and/or by determining that the speed does not meet, and/or is less than, the swipe speed threshold. The computing device 100 can respond to the slow swipe down gesture 316A by transitioning from presenting the full profile 300 to presenting the miniprofile 200. In some examples, the computing device 100 can transition from presenting the full profile 300 to presenting the miniprofile 200 by scrolling the full profile 300 downward from a top portion 328 of the display 102 toward the bottom portion 228 of the display 102.

FIG. 3C shows a user inputting a fast swipe down gesture 316B to the swipe icon 220 within the full profile 300. The computing device 100 can determine that the swipe down gesture 316B is a fast swipe down gesture by comparing the speed of the downward swipe to the swipe speed threshold and/or by determining that the speed meets and/or exceeds the swipe speed threshold. The computing device 100 can respond to the fast swipe down gesture 316B by transitioning from presenting the full profile 300 to presenting the feed 106. In some examples, the computing device 100 can transition from presenting the full profile 300 to presenting the feed 106 by scrolling the full profile 300 downward from the top portion 328 of the display 102 toward the bottom portion 228 of the display 102.

Figure 4:
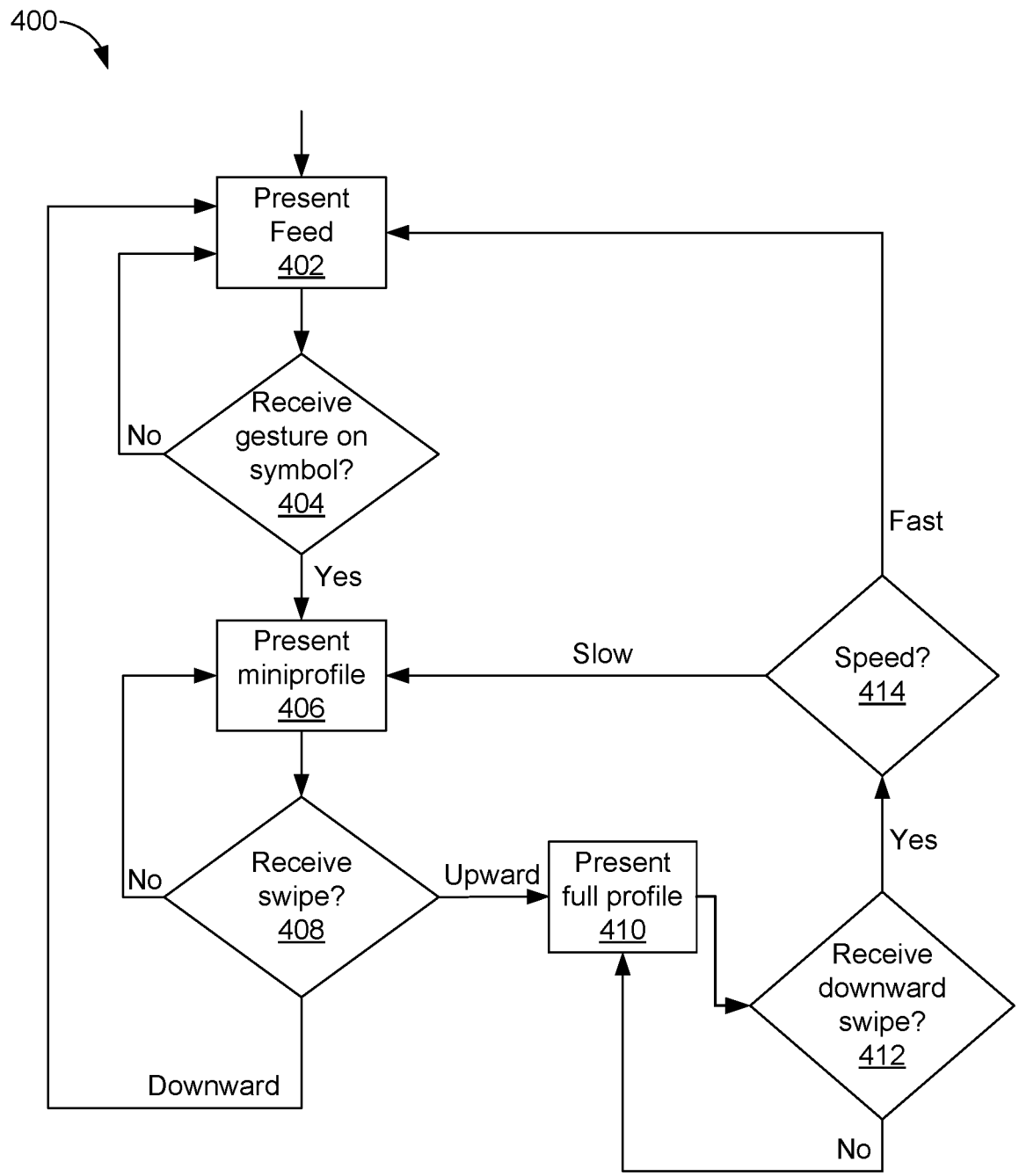
FIG. 4 is a flowchart showing a method performed by the computing device.

FIG. 4 is a flowchart showing a method 400 performed by the computing device 100. The computing device 100 can present the feed 106 (402) via the GUI 104 presented on the display 102. The computing device 100 can present the feed 106 (402) until receiving an input, such as a gesture on a symbol associated with an account. In some examples, the computing device 100 can modify and/or change the feed 106, such as by scrolling the feed up or down and/or presenting different and/or new posts, in response to inputs such as upward or downward scrolling gestures.

The computing device 100 can determine whether the computing device 100 received an input on a symbol (404). The symbol can be associated with an account for which the computing device 100 can present a miniprofile 200 (406). The input on the symbol can include, for example, a gesture 116 such as a tap on an avatar 110A associated with an account, as shown in FIG. 1B, or a gesture 116 such as a tap on a handle 112B associated with an account, as shown in FIG. 1C. If the computing device 100 determines that the computing device 100 has not received the input on the symbol, then the computing device 100 can continue presenting the feed 106 (402).

If the computing device 100 determines that the computing device 100 has received input on the symbol, then the computing device 100 can present the miniprofile 200 (406) via the GUI 104 on the display 102. The computing device 100 can present the miniprofile 200 (406) by, for example, scrolling the miniprofile 200 up from the bottom portion 228 of the display 102 so that the miniprofile 200 covers a portion of the feed 106, as shown in FIG. 2A.

While presenting the miniprofile 200 (406), the computing device 100 can determine whether the computing device 100 received a swipe (408) at the swipe icon 220. If the computing device 100 does not receive a swipe gesture 116 at the swipe icon 220, then the computing device 100 can continue presenting the miniprofile 200 (406).

If the computing device 100 does receive a swipe gesture 116 at the swipe icon 220, then the computing device 100 can determine whether the swipe gesture 116 was an upward swipe or a downward swipe. If the computing device 100 determines that the swipe gesture 116 was a downward swipe 116B, as shown in FIG. 2F, then the computing device 100 can transition from presenting the miniprofile 200 (406) back to presenting the feed 106 (402). The computing device 100 can transition from presenting the miniprofile 200 (406) back to presenting the feed 106 (402) by, for example, scrolling the miniprofile 200 down toward the bottom portion 228 of the display 102. If the computing device 100 determines that the swipe gesture 116 was an upward swipe 116A, as shown in FIG. 2E, then the computing device 100 can transition from presenting the miniprofile 200 (406) to presenting the full profile 300 (410).

In response to receiving the upward swipe 116A, the computing device 100 can present the full profile 300 (410). While presenting the full profile 300 (410), the computing device 100 can determine whether the computing device 100 received a downward swipe 316A, 316B (412) at the swipe icon 220. If the computing device 100 determines that the computing device 100 has not received a downward swipe 316A, 316B (412) at the swipe icon 220, then the computing device 100 can continue presenting the full profile 300 (410).

If the computing device 100 does receive a downward swipe 316A, 316B at the swipe icon 220, then the computing device 100 can determine a speed (414) of the downward swipe 316A, 316B. If the computing device 100 determines that the downward swipe 316A, 316B was a fast downward swipe, and/or a fast swipe down gesture 316B, then the computing device 100 can transition from presenting the full profile 300 to presenting the feed 106 (402). If the computing device 100 determines that the downward swipe 316A, 316B was a slow downward swipe, and/or a slow swipe down gesture 316A, then the computing device 100 can transition from presenting the full profile 300 to presenting the miniprofile 200 (406).

Figure 5:
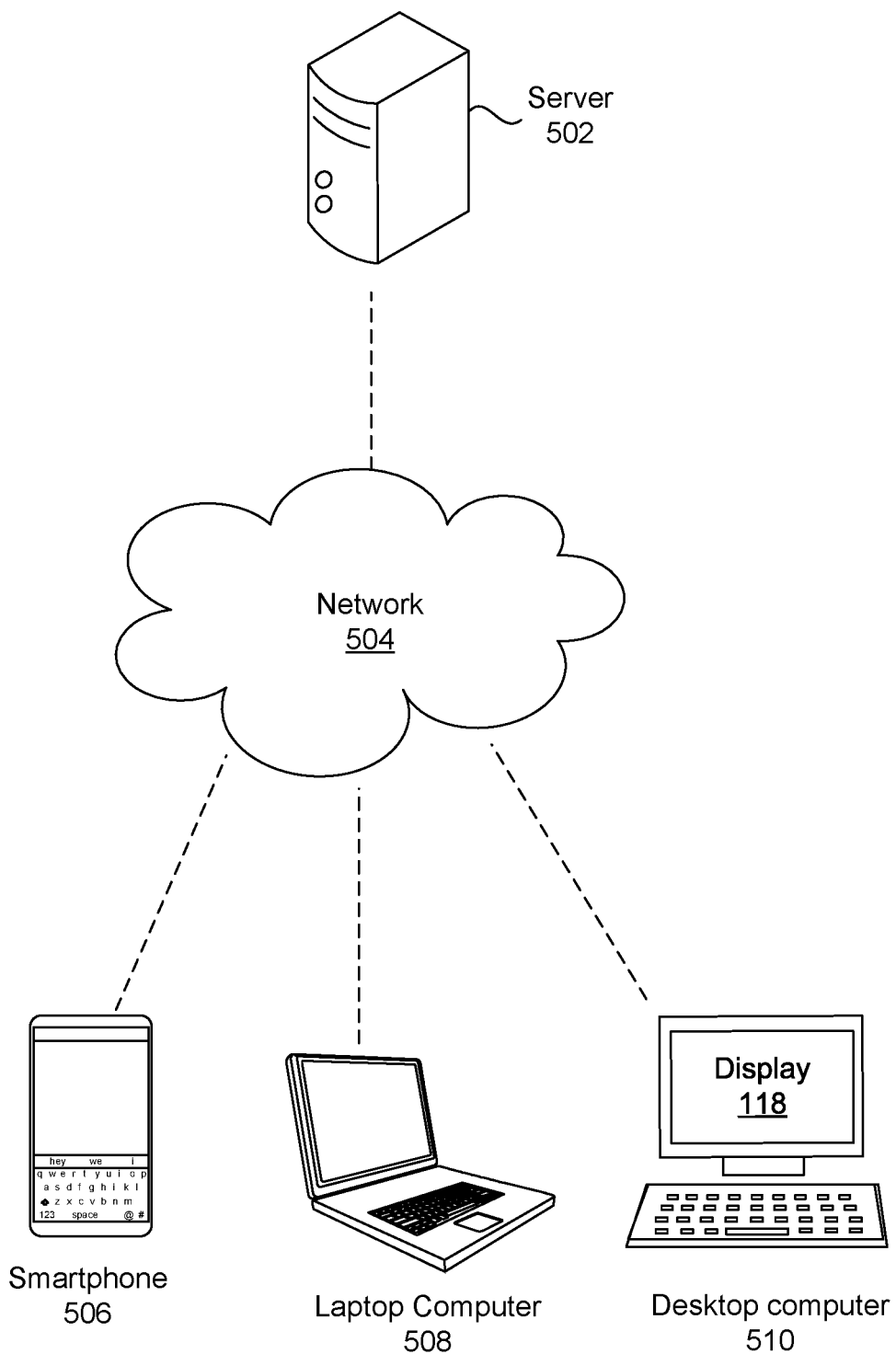
FIG. 5 is a network diagram showing entities in communication with each other.

FIG. 5 is a network diagram showing entities in communication with each other. A server 502 can communicate with other computing devices, such as a smartphone 506, a laptop computer 508, and/or a desktop computer 510. The smartphone 506, laptop computer 508, and/or desktop computer 510 can be examples of the computing device 100. While three computing devices, the smartphone 506, laptop computer 508, and/or desktop computer 510, are shown in FIG. 5, the server 502 can communicate with many more than three computing devices.

The server 502 can store account information associated with accounts, such as information including posts 108A, 108B, 108C included in the feed 106 shown in FIG. 1A, information included in the miniprofile 200 shown in FIG. 2A, and/or information included in the full profile 300 shown in FIG. 3A. The server 502 can receive the account information from computers via a network 504. The network 504 can include, for example, the Internet. The server 502 can also receive, from the computing devices, information to be included in posts 108A, 108B, 108C, miniprofile 200, and/or full profile. The server 502 can send, to the computing devices in response to the computing devices opening an application or webpage associated with the server 502, information to be included in posts 108A, 108B, 108C, and/or feeds 106, miniprofiles 200, and/or full profiles 300.

Figure 6:
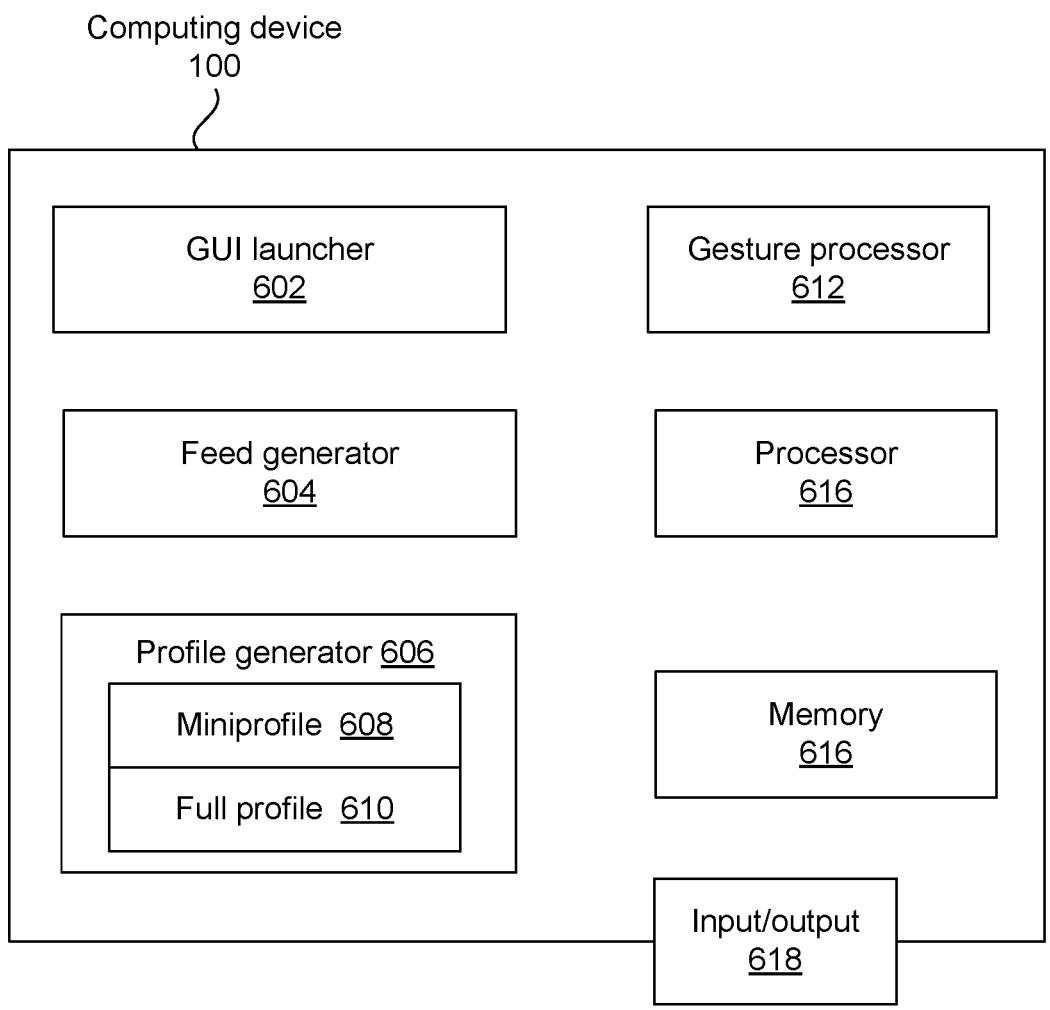
FIG. 6 is a block diagram of the computing device.

FIG. 6 is a block diagram of the computing device 100. While the methods, functions, and/or techniques are described herein as being performed by a local computing device such as the smartphone 506, laptop computer 508, and/or desktop computer 510 shown in FIG. 5, in some examples, such as web applications, any combination of the methods, functions, and/or techniques described herein can be performed by the server 502 shown in FIG. 5. In some examples, the components, methods, functions, and/or techniques described herein can be distributed among multiple computing devices.

The computing device 100 can include a graphical user interface (GUI) launcher 602. The GUI launcher 602 can launch the GUI 106 within the display 102. In some examples, the GUI launcher 602 can launch the GUI 106 in response to a user launching a particular application and/or opening a particular webpage within a browser. The GUI launcher 602 can cause the display 102 to present any combination of elements described above. The GUI launcher 602 can cause the display 102, or any human interface device (HID), to receive and/or process input in association with the elements displayed by the GUI 602, such as tap or swipe gestures.

The computing device 100 can include a feed generator 604. The feed generator 604 can generate the feed 106, and/or populate the feed 106 with posts 108A, 108B, 108C. The feed generator 604 can populate the feed 106 with posts 108A, 108B, 108C based on accounts that the user has expressed interest in and/or chosen to follow, and/or based on similarity to other posts that the user has expressed interest in.

The computing device 100 can include a profile generator 606. The profile generator 606 can generate profiles 200, 300 within the GUI 104. The profile generator 606 can, for example, generate a miniprofile 200 in response to input such as a tap gesture on a symbol such as an avatar 110A, 110B, 110C or handle 112A, 112B, 112C, or in response to a slow swipe down gesture 316A on the swipe icon 220 within the full profile. The profile generator 606 can, for example, generate a full profile 300 in response to input on a symbol such as an avatar 110A, 110B, 110C or handle 112A, 112B, 112C, or in response to a swipe up gesture 116A on the swipe icon 220 within the miniprofile 200.

The computing device 100 can include a gesture processor 612. The gesture processor 612 can process gestures, such as touch input into the display 102. The gesture processor 612 can process gestures to determine a type of gesture that the computing device 100 should recognize and/or respond to. The gesture recognizer 612 can, for example, determine whether an input was a tap onto a symbol such as an avatar 110A, 110B, 110C or handle 112A, 112B, 112C, a tap onto a follow button 222, an upward swipe 116A onto the swipe icon 220, a slow swipe down gesture 316A onto the swipe icon 220, and/or a fast swipe down gesture 316B onto the swipe icon, as non-limiting examples.

The computing device 100 can include at least one processor 614. The at least one processor 614 can execute instructions to cause the computing device 100 to perform any combination of functions, methods, and/or techniques described herein.

The computing device 100 can include at least one memory device 616. The at least one memory device 616 can include a non-transitory computer-readable storage medium comprising instructions stored thereon that, when executed by the at least one processor 614, are configured to cause a computing system such as the computing device 100 to perform any combination of functions, methods, and/or techniques described herein.

The computing device 100 can include at least one input/output node 618. The at least one input/output node 618 can include input nodes for receiving input from a user, such as a touchscreen, microphone, buttons, a keyboard, and/or a mouse, as non-limiting examples. The at least one input/output node 618 can include output nodes for providing output to a user, such as a display 102 and/or speaker, as non-limiting examples. The at least input/output node 618 can include nodes for communicating with other computing devices such as the server 502 via access points and/or base stations, such as wired interfaces including an Institute for Electrical and Electronics Engineers (IEEE) 802.3 Ethernet Port, a High-Definition Multimedia Interface (HDMI) port, or a Universal Serial Bus (USB) port, as non-limiting examples, and/or wireless interfaces such as IEEE 802.11 Wireless Fidelity interfaces, Long-term Evolution (LTE) interfaces, or other cellular communication interfaces, as non-limiting examples.

Figure 7:
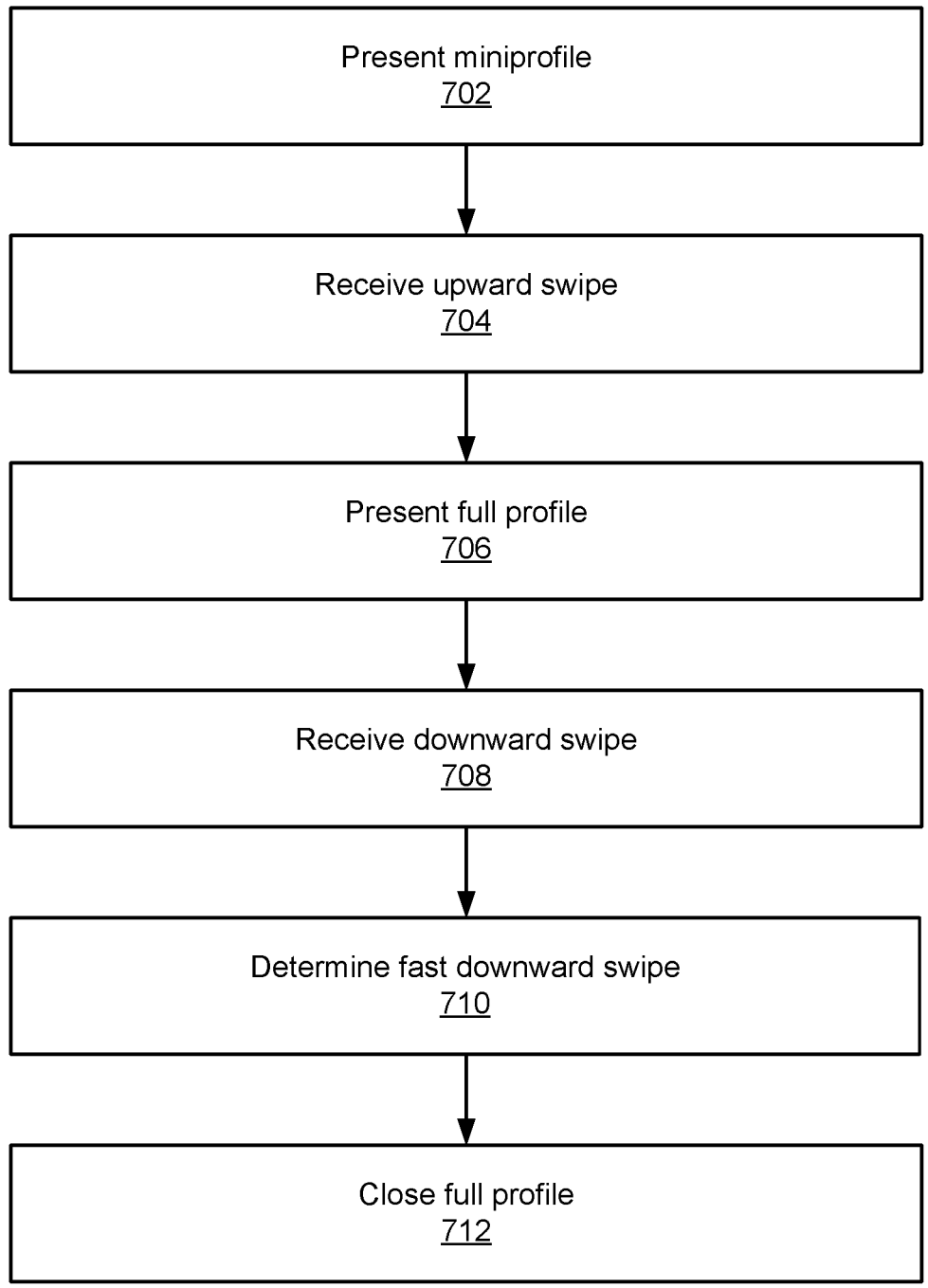
FIG. 7 shows a method performed by the computing device.

FIG. 7 shows a method performed by the computing device 100. The method can include presenting, within a graphical user interface (GUI) on a display, a miniprofile (702). The miniprofile can comprise an avatar associated with a first account, a handle associated with the first account, a description associated with the first account, and a swipe icon. The method can include receiving, at the swipe icon within the miniprofile, an upward swipe (704). The method can include, in response to receiving the upward swipe, presenting, within the GUI, a full profile (706). The full profile can occupy a larger portion of the display than the miniprofile. The full profile can comprise an image associated with the first account, the avatar, the handle, the description, and at least a first post associated with the first account. The method can include receiving, at the swipe icon within the full profile, a downward swipe (708). The method can include determining that the downward swipe was a fast downward swipe (710). The method can include, based on determining that the downward swipe was the fast downward swipe, closing the full profile (712) and presenting, within the GUI, a feed. The feed can comprise at least a second post associated with a second account and a third post associated with a third account.

According to some examples, the method can further include receiving, at the swipe icon within the full profile, a slow downward swipe, and in response to receiving the slow downward swipe, closing the full profile and presenting, within the GUI, the miniprofile.

According to some examples, a top portion of the miniprofile can be located within a middle third of the display.

According to some examples, a top portion of the full profile can be located within a top third of the display.

According to some examples, the closing the full profile can comprise scrolling the full profile toward a bottom portion of the display.

Figure 8:
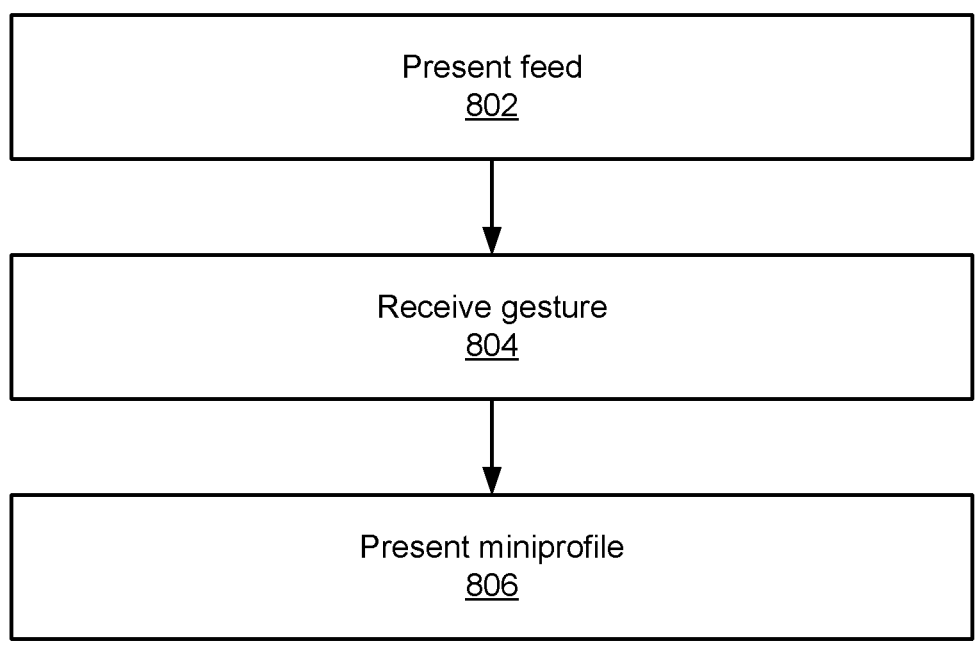
FIG. 8 shows a method performed by the computing device.

FIG. 8 shows a method performed by the computing device 100. The method can include presenting, within a graphical user interface (GUI) on a display, a feed (802). The feed can comprise at least a first post and a second post. The first post can include a first symbol associated with a first account and first content associated with the first account. The second post can include a second symbol associated with a second account and second content associated with the second account. The method can include receiving, at the first symbol, a gesture (804). The method can include, in response to receiving the gesture, presenting, within the GUI, a miniprofile (806). A top portion of the miniprofile can be located in a middle third of the display. The miniprofile can at least partially cover at least one of the first post or the second post. The miniprofile can comprise at least the first symbol, a description associated with the first account, and a swipe icon.

According to some examples, the symbol associated with the first account can comprise a handle including a text string associated with the first account.

According to some examples, the symbol associated with the first account can comprise an image disposed inside a circle. The image can be associated with the first account.

According to some examples, the gesture can comprise a single-finger gesture.

According to some examples, the gesture can comprise a tap.

According to some examples, the gesture can comprise an upward swipe.

According to some examples, the gesture can comprise hovering a cursor over the symbol.

According to some examples, the presenting the miniprofile can comprise presenting the miniprofile scrolling up from a bottom of the display.

According to some examples, when the miniprofile is presented, the first post and the second post can remain in same positions on the display as before the miniprofile was presented. At least one of the first post or the second post can be at least partially covered by the miniprofile.

According to some examples, the miniprofile does not include any posts associated with the first account.

Figure 9:
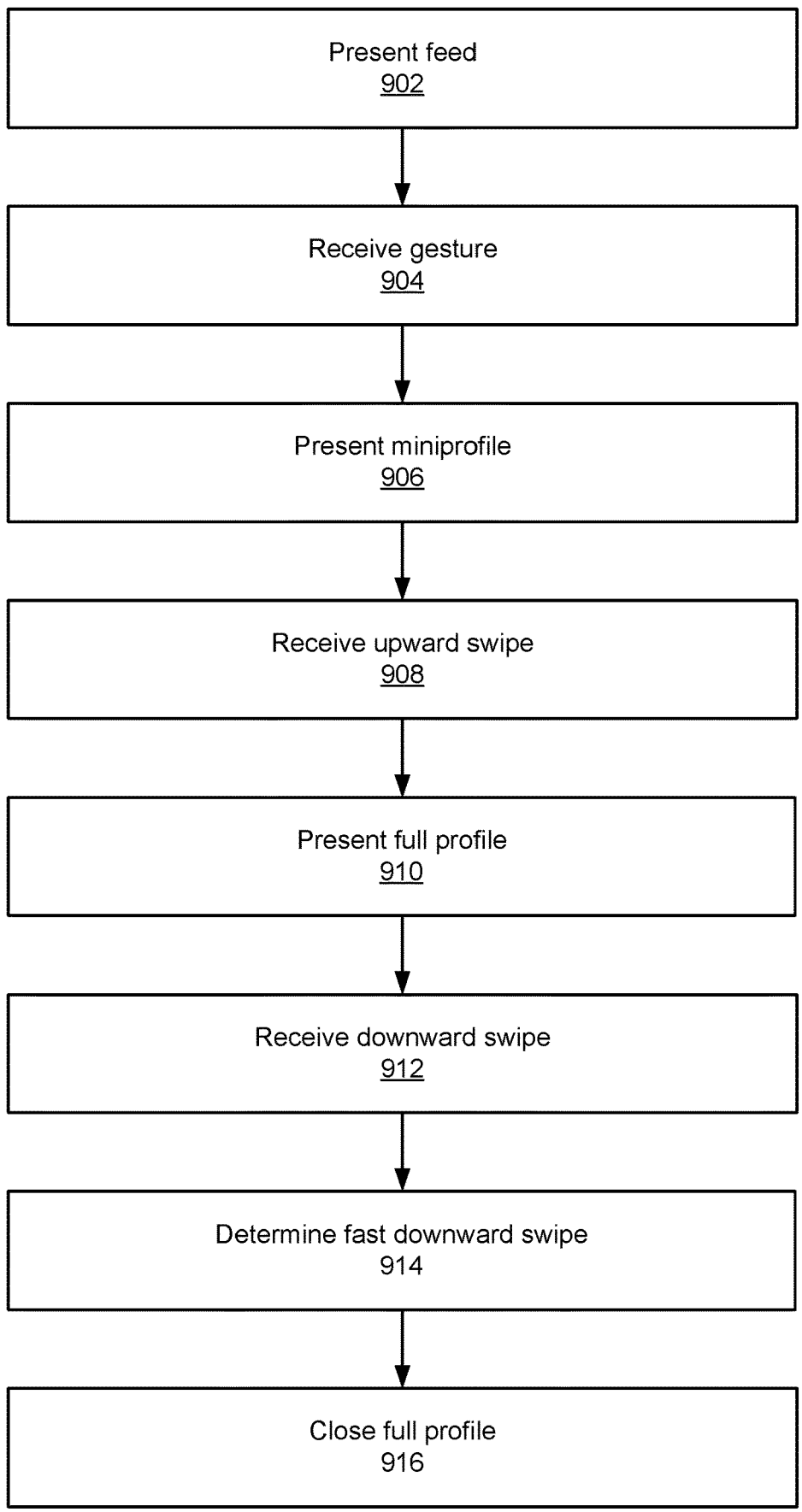
FIG. 9 shows a method performed by the computing device.

FIG. 9 shows a method performed by the computing device 100. The method can include presenting, within a graphical user interface (GUI) on a display, a feed (902). The feed can comprise a least a first post and a second post. The first post can include a first symbol associated with a first account and first content associated with the first account. The second post can include a second symbol associated with a second account and second content associated with the second account. The method can include receiving, at the first symbol, a gesture (904). The method can include, in response to receiving the gesture, presenting, within the GUI, a miniprofile (906). A top portion of the miniprofile can be located in a middle third of the display. The miniprofile can at least partially cover at least one of the first post or the second post. The miniprofile can comprise at least the first symbol, a description associated with the first account, and a swipe icon. The method can include receiving, at the swipe icon within the miniprofile, an upward swipe (908). The method can include, in response to receiving the upward swipe, presenting, within the GUI, a full profile (910). The full profile can occupy a larger portion of the display than the miniprofile. The full profile can comprise an image associated with the first account, the first symbol, the description associated with the first account, at least a first post associated with the first account, and the swipe icon. The method can include receiving, at the swipe icon within the full profile, a downward swipe (912). The method can include determining that the downward swipe was a fast downward swipe (914). The method can include, based on determining that the downward swipe was the fast downward swipe, closing the full profile (916) and presenting, within the GUI, the feed.

According to some examples, the method can further include receiving, at the swipe icon within the full profile, a slow downward swipe, and, in response to receiving the slow downward swipe, closing the full profile and presenting, within the GUI, the miniprofile.

According to some examples, a top portion of the miniprofile can be located within a middle third of the display.

According to some examples, a top portion of the full profile can be located within a top third of the display.

According to some examples, when the miniprofile is presented, the first post and the second post can remain in same positions on the display as before the miniprofile was presented, at least one of the first post or the second post being at least partially covered by the miniprofile.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A non-transitory computer-readable storage medium comprising instructions stored thereon, the instructions, when executed by at least one processor, being configured to cause a computing system to at least:

present, within a graphical user interface (GUI) on a display, a miniprofile, the miniprofile comprising an avatar associated with a first account, a handle associated with the first account, a description associated with the first account, a swipe icon, and a follow button;

in response to receiving input to the follow button, send a follow request to a server, the follow request identifying the first account and requesting the server to send a plurality of posts uploaded by the first account;

receive, at the swipe icon within the miniprofile, an upward swipe;

in response to receiving the upward swipe, present, within the GUI, a full profile, the full profile occupying a larger portion of the display than the miniprofile, the full profile comprising an image associated with the first account, the avatar, the handle, the description, and at least a first post uploaded by the first account;

receive, within the full profile, a downward swipe; and determine whether the downward swipe was a fast downward swipe or a slow downward swipe, based on the downward swipe being the fast downward swipe, close the full profile and present, within the GUI, a feed, the feed comprising at least a second post uploaded by a second account and a third post uploaded by a third account, and based on the downward swipe being the slow downward swipe, close the full profile and present, within the GUI, the miniprofile.

2. The non-transitory computer-readable storage medium of claim 1, wherein the instructions are further configured to cause the computing system to:

determine that the downward swipe was the slow downward swipe;

based on determining that the downward swipe was the slow downward swipe, close the full profile and present, within the GUI, the miniprofile;

in response to receiving a second upward swipe, present, within the GUI, the full profile;

receive, at the swipe icon within the full profile, a second downward swipe;

determine that the second downward swipe was the fast downward swipe; and based on determining that the second downward swipe was the fast downward swipe, close the full profile and present, within the GUI, the feed.

3. The non-transitory computer-readable storage medium of claim 1, wherein a top portion of the full profile is located within a top third of the display.

4. The non-transitory computer-readable storage medium of claim 1, wherein the closing the full profile comprises scrolling the full profile toward a bottom portion of the display.

5. The non-transitory computer-readable storage medium of claim 1, wherein:

a top portion of the miniprofile is located in a middle third of the display; and a bottom portion of the miniprofile is located in a bottom third of the display.

6. The non-transitory computer-readable storage medium of claim 5, wherein the bottom portion of the miniprofile is located at a bottom portion of the display.

7. The non-transitory computer-readable storage medium of claim 1, wherein the second post includes an avatar associated with the second account, a handle associated with the second account, and content uploaded by the second account.

8. The non-transitory computer-readable storage medium of claim 1, wherein the second post includes an avatar associated with the second account, a handle associated with the second account, and text uploaded by the second account.

9. The non-transitory computer-readable storage medium of claim 1, wherein the second post includes an avatar associated with the second account, a handle associated with the second account, and an image uploaded by the second account.

10. A non-transitory computer-readable storage medium comprising instructions stored thereon, the instructions, when executed by at least one processor, being configured to cause a computing system to at least:

present, within a graphical user interface (GUI) on a display, a feed, the feed comprising at least a first post and a second post, the first post including a first symbol associated with a first account that uploaded the first post, first content uploaded by the first account, and a second symbol associated with a second account, the second account being different that the first account that uploaded the first post, the second post including a third symbol associated with a third account and second content uploaded by the third account;

receive, at the second symbol, a gesture;

in response to receiving the gesture, present, within the GUI, a miniprofile, a top portion of the miniprofile being located in a middle third of the display, the miniprofile at least partially covering at least one of the first post or the second post, the miniprofile comprising at least the second symbol, a description associated with the second account, and a swipe icon;

receive, at the swipe icon within the miniprofile, a first upward swipe;

in response to receiving the first upward swipe, present, within the GUI, a full profile, the full profile occupying a larger portion of the display than the miniprofile, the full profile comprising the description and at least a third post uploaded by the second account;

receive, at the swipe icon within the full profile, a first downward swipe;

determine that the first downward swipe was a slow downward swipe;

based on determining that the first downward swipe was the slow downward swipe, close the full profile and present, within the GUI, the miniprofile;

receive, at the swipe icon within the miniprofile, a second upward swipe;

in response to receiving the second upward swipe, present, within the GUI, the full profile;

receive, within the full profile, a second downward swipe;

determine that the second downward swipe was a fast downward swipe; and based on determining that the second downward swipe was the fast downward swipe, close the full profile and present, within the GUI, the feed.

11. The non-transitory computer-readable storage medium of claim 10, wherein the first symbol associated with the first account comprises a handle including a text string associated with the first account.

12. The non-transitory computer-readable storage medium of claim 10, wherein the first symbol associated with the first account comprises an image disposed inside a circle, the image being associated with the first account.

13. The non-transitory computer-readable storage medium of claim 10, wherein the gesture comprises an upward swipe.

14. The non-transitory computer-readable storage medium of claim 10, wherein the presenting the miniprofile comprises presenting the miniprofile scrolling up from a bottom of the display.

15. The non-transitory computer-readable storage medium of claim 10, wherein, when the miniprofile is presented, the first post and the second post remain in same positions on the display as before the miniprofile was presented, at least one of the first post or the second post being at least partially covered by the miniprofile.

16. The non-transitory computer-readable storage medium of claim 10, wherein the miniprofile does not include any posts associated with the second account.

17. A non-transitory computer-readable storage medium comprising instructions stored thereon, the instructions, when executed by at least one processor, being configured to cause a computing system to at least:

present, within a graphical user interface (GUI) on a display, a feed, the feed comprising a least a first post and a second post, the first post including a first symbol associated with a first account that uploaded the first post, first content uploaded by the first account, and a second symbol associated with a second account, the second account being different that the first account that uploaded the first post, the second post including a third symbol associated with a third account and second content uploaded by the third account;

receive, at the first symbol, a first gesture;

in response to receiving the first gesture, present, within the GUI, a miniprofile, a top portion of the miniprofile being located in a middle third of the display, the miniprofile at least partially covering at least one of the first post or the second post, the miniprofile comprising at least the second symbol, a description associated with the second account, a swipe icon, and a follow button;

in response to receiving input to the follow button, send a follow request to a server, the follow request identifying the second account and requesting the server to send posts uploaded by the second account;

receive, at the swipe icon within the miniprofile, a first upward swipe;

in response to receiving the first upward swipe, present, within the GUI, a full profile, the full profile occupying a larger portion of the display than the miniprofile, the full profile comprising an image associated with the first account, the first symbol, the description associated with the first account, at least a third post uploaded by the second account, and the swipe icon;

receive, within the full profile, a first downward swipe;

determine that the first downward swipe was a fast downward swipe;

based on determining that the first downward swipe was the fast downward swipe, close the full profile and present, within the GUI, the feed;

receive, at the first symbol, a second gesture;

in response to receiving the second gesture, present, within the GUI, the miniprofile;

receive, at the swipe icon within the miniprofile, a second upward swipe;

in response to receiving the second upward swipe, present, within the GUI, the full profile;

receive, within the full profile, a second downward swipe;

determine that the second downward swipe was a slow downward swipe; and based on determining that the second downward swipe was the slow downward swipe, close the full profile and present, within the GUI, the miniprofile.

18. The non-transitory computer-readable storage medium of claim 17, wherein a top portion of the full profile is located within a top third of the display.

19. The non-transitory computer-readable storage medium of claim 17, wherein, when the miniprofile is presented, the first post and the second post remain in same positions on the display as before the miniprofile was presented, at least one of the first post or the second post being at least partially covered by the miniprofile.

20. The non-transitory computer-readable storage medium of claim 17, wherein a bottom portion of the miniprofile is located at a bottom portion of the display.

* * * * *